United States Patent

Tajima et al.

Patent Number: 5,840,096
Date of Patent: Nov. 24, 1998

[54] PROCESS FOR THE PRODUCTION OF POLARIZING GLASS

[75] Inventors: Hidemi Tajima, Tokyo; Takeshi Takahashi, Yamanashi; Yukari Miyashita; Yoshihiko Matsuoka, both of Tokyo, all of Japan

[73] Assignee: Hoya Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 578,942

[22] Filed: Dec. 27, 1995

[30] Foreign Application Priority Data

Dec. 27, 1994 [JP] Japan .................................. 6-325062

[51] Int. Cl.⁶ .......................... C03B 23/037; C03C 23/00
[52] U.S. Cl. ............................ 65/30.1; 65/32.3; 65/32.5; 65/33.3; 65/102
[58] Field of Search ......................... 65/30.1, 30.11, 65/32.3, 32.5, 33.3, 102

[56] References Cited

U.S. PATENT DOCUMENTS

| | | | |
|---|---|---|---|
| 3,653,863 | 4/1972 | Araujo et al. | 65/30.11 |
| 3,954,485 | 5/1976 | Seward, III et al. | 106/47 |
| 4,282,022 | 8/1981 | Lo et al. | 65/85 |
| 4,304,584 | 12/1981 | Borelli et al. | 65/30.11 |
| 4,339,256 | 7/1982 | Simms | 65/32.5 |
| 4,479,819 | 10/1984 | Borelli et al. | 65/30.11 |
| 4,486,213 | 12/1984 | Lentz et al. | 65/30.1 |
| 4,908,054 | 3/1990 | Jones et al. | 65/30.11 |
| 5,430,573 | 7/1995 | Araujo et al. | 359/361 |

FOREIGN PATENT DOCUMENTS

| | | |
|---|---|---|
| 2-40619 | 9/1990 | Japan . |
| 5-208844 | 8/1993 | Japan . |

OTHER PUBLICATIONS

Patent Abstracts of Japan, vol. 017, No. 647, Dec. 1993 (JP–A–05–208844).
Patent Abstracts of Japan, vol. 015, No. 369, Sep. 1991 (JP–A–03 146433).
Patent Abstracts of Japan, vol. 015, No. 377, Sep. 1991 (JP–A–03 153538).

*Primary Examiner*—Stanley S. Silverman
*Assistant Examiner*—Sean Vincent
*Attorney, Agent, or Firm*—Burns,Doane, Swecker & Mathis, L.L.P.

[57] ABSTRACT

A process for producing a polarizing glass containing shape-anisotropic metallic particles dispersed in an oriented state therein, which comprises drawing a glass preform containing metallic halide particles dispersed therein while its viscosity being held above $2\times10^6$, but below $7\times10^7$ poises; and subjecting the drawn glass to a reducing treatment so that a part or all of the metallic halide particles are reduced to metallic particles, which process enables it to produce a polarizing glass with a high yield from a starting material of a glass containing metallic halide particles, while avoiding glass to breakage or fracture during elongation as well as preventing the elongated metallic halide particles from returning to a spherical shape.

9 Claims, 4 Drawing Sheets

Position of Peak Temperature in Furnace

PROCESS FOR THE PRODUCTION OF POLARIZING GLASS

BACKGROUND OF THE INVENTION

The present invention relates to a process for producing polarizing glass articles. More specifically, the present invention relates to a process for producing infrared polarizing glass articles containing fine metallic particles having an anisotropic shape and being excellent in polarizing properties (with an extinction ratio of 40 dB or more). The articles can be used as polarizers utilized in miniature optical isolators adapted for optical communication, optical switches comprising a liquid crystal, an electro-optical crystal, a Faraday rotator etc., as well as electromagnetic sensors.

Glass articles containing shape-anisotropic fine metallic particles, such as silver or copper, dispersed in an oriented state therein have been known to behave as optical polarizers. In such glasses, the wavelength of the resonance absorption peak of the metal particles can vary depending upon the direction of incident polarized light. It has also been known that such polarizing glasses could be produced by reducing glasses containing elongated copper halide or silver halide particles.

Silver-free polarizing photochromic glasses and a production process thereof have been disclosed in U.S. Pat. No. 3,954,485. The disclosed glasses show polarizing properties in the darkened state of photochromic. The polarizing properties, however, are obtainable only in the darkened state and the resulting extinction ratio is as low as 10 dB, which is too low to apply them as optical isolators. According to the process described in the patent, starting glasses are stretched in a temperature region that imparts a viscosity of $1 \times 10^7$ to $1 \times 10^9$ poises to 100 to 1000 Å particles in the secondary phase (separated borate-rich phase) containing 20 to 50 Å copper halide/cadmium phase, so that the secondary phase can be elongated to have an aspect ratio of 2:1 to 5:1 whereby polarizing photochromic glasses are produced. However, when the intended polarizing glasses are to be produced by starting with a glass containing metallic halide particles, elongation of the particles is difficult and the elongated particles easily return to a spherical shape. This is because the interfacial energy generated between metallic halide particles and glass is higher than that generated between the secondary phase and glass on one hand and an aspect ratio of 10:1 or more is required on the other hand. Thus, it is impossible to elongate metallic halide particles at a viscosity of less than $1 \times 10^8$ poises.

A process for production of polarizing glass by starting with a glass containing copper halide particles is disclosed in the Japanese Patent Application Laid Open (JP-A-) No. 5-208844. The disclosed process comprises the steps of elongating copper halide particles in the glass by pulling or extruding the glass containing copper halide particles at a temperature at which the glass exhibits a viscosity of $10^8$ to $10^{11}$ poises and then heat treating the elongated glass under a reducing atmosphere to reduce the copper halide particles whereby a polarizing glass containing elongated shape-anisotropic metallic copper particles is produced.

A process for production of polarizing glass by starting with a glass containing silver halide particles is disclosed in the Japanese Patent Application Laid Open (JP-A-) No. 59-83951. Also in the process, the elongation of silver halide particles is effected by pulling or extruding the glass at a temperature at which the glass exhibits a viscosity of $10^8$ to $10^{13}$ poises, in a manner substantially similar to that of the glass containing copper halide particles.

In these glass stretching processes cited above, proper working temperature and cooling procedure should be applied so as to prevent the elongated particles from returning to a spherical shape. This is because, when the glass is elongated at a temperature at which the glass exhibits a viscosity lower than $10^8$ poises, the elongated particles are likely to return to a spherical shape and thus it is substantially impossible to obtain a polarizing glass.

Moreover, in the processes mentioned above, a high stress is required so as to achieve the elongation of silver halide particles. Such high stress, however, may exceed the practical maximum breaking stress of the glass when applied to the glass in the above-defined viscosity range. Hence, the glass would frequently break or fracture during the elongation step irrespective of the nature of the particles contained therein. The same problem occurs in the process of the Japanese Patent Application Laid Open (JP-A-) No. 5-208844 comprising the elongation of copper halide particles to obtain a polarizing glass. The break or fracture of the glass during the elongation step may remarkably decrease the factory production efficiency of the polarizing glass, thus should not be neglected from the viewpoint of practical use.

Under these circumstances, the above-cited Japanese Patent Application Laid Open (JP-A-) No. 59-83951 has disclosed a process for drawing a composite (laminated) glass, according to which the glass particles may be elongated without breaking the glass.

The glass stretching step of the drawing process described in this document is schematically shown in FIG. 2. In FIG. 2, a glass to be redrawn is composed of a potential polarizing core glass 9 and a surface glass 10. A blank 8 is passed through a heater part of a redrawing furnace indicated by the arrow 11, where it is heated and elongated under tension applied by pulling rolls 12, whereby the blank can be converted to a laminated polarizing glass sheet or strip 13. This document reports that if a silver halide-containing glass is subjected to redrawing or stretching under the conditions under which the glass exhibits a viscosity of about $10^8$ poises, a polarizing glass could be produced without giving rise to glass break or fracture during the stretching step. According to this process, in order to avoid breaking of the stretched article, the potential polarizing core glass 9 is coated with glass 10 which exhibits a considerably low viscosity so that there remains scarcely any tensile stress on the surface of the glass.

However, when a laminated polarizing glass is to be produced according to the process mentioned above, the first problem is that there would still remain the glass having a low viscosity in the form of a surface layer even after the completion of the glass elongation. Hence, it would take a lengthy period of time to reduce the metallic halide particles contained in the core glass. In fact, the reduction of the metallic halide particles in the core glass can be started only after a gaseous reducing agent has passed through the surface layer.

The second problem is that, even if the glass could be prevented from breaking, since a glass containing metallic halide particles is coated with a superficial glass having a low viscosity, the elongated glass would be difficult to be cooled efficiently and hence the elongated particles will still attain the tendency of returning to a spherical shape.

That is, there has been as yet unknown a process for efficiently producing a polarizing glass while avoiding glass to breakage or fracture during the elongation step and preventing the elongated particles from returning to a spherical shape as well.

In laboratory scale, a polarizing glass containing shape-anisotropic metallic particles is produced by pulling a glass containing metallic halide particles in the form of rod or plate from both ends. With such a process, however, it is only in the central part of the elongated sample that particles elongated to the desired state (aspect ratio) can be obtained and thus this process is unable to be practically used as such from the viewpoint of production efficiency.

To be practical, a starting glass containing metallic halide particles should be converted into a glass containing elongated metallic halide particles while minimizing glass loss.

Moreover, in order to avoid the insertion loss and the deformation of transmitted light beam, the light receiving face and the light emitting face of a polarizing glass should be polished to improve the surface precision. Conventionally, a glass preform containing metallic halide particles dispersed therein had been stretched without surface polishing, then both of the light receiving face and the light emitting face have been polished prior to reduction treatment.

In such a process, however, it might happen that a glass body thinner than a few mm thick is likely to deform when polished and hence it is expensive to polish such a glass precisely, Therefore, an object of the present invention is to provide a process for production of a polarizing glass article which is capable of producing a polarizing glass from a starting material of a glass containing metallic halide particles with a high yield, while avoiding glass breakage or fracture during the elongation step as well as preventing the elongated metallic halide particles from returning to a spherical shape.

Another object of the present invention is to provide a process for the production of a polarizing glass having a high surface precision from a starting material of a glass containing metallic halide particles with a high yield, while avoiding glass breakage or fracture during the elongation step as well as preventing the elongated metallic halide particles from returning to a spherical shape.

SUMMARY OF THE INVENTION

According to the present invention, there is provided a process for producing a polarizing glass article containing metallic particles exhibiting an anisotropic shape dispersed in an oriented state therein, which process comprises the steps of:

drawing a glass preform containing metallic halide particles dispersed therein while its viscosity is held above $2 \times 10^6$, but below $7 \times 10^7$ poises; and subjecting the drawn glass to reducing treatment so that a part or all of the metallic halide particles are reduced to metallic particles.

There is also provided the process for producing the polarizing glass as defined above, wherein the drawing step is effected on a glass preform having at least two polished faces opposite to each other.

DESCRIPTION OF THE PREFERRED EMBODIMENTS

Figure 1:
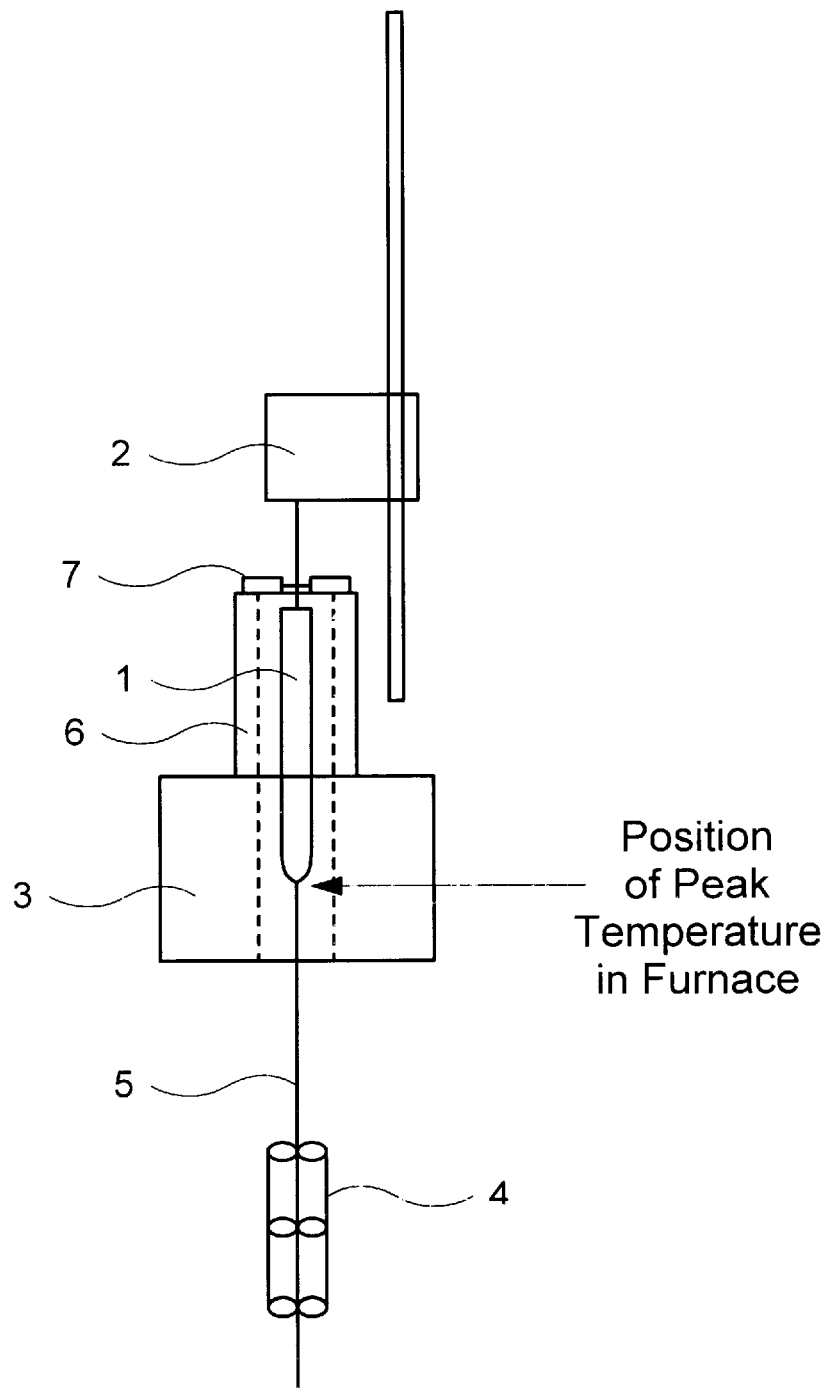
FIG. 1 represents a schematic view of a drawing apparatus applicable to the process of the present invention.
Figure 2:
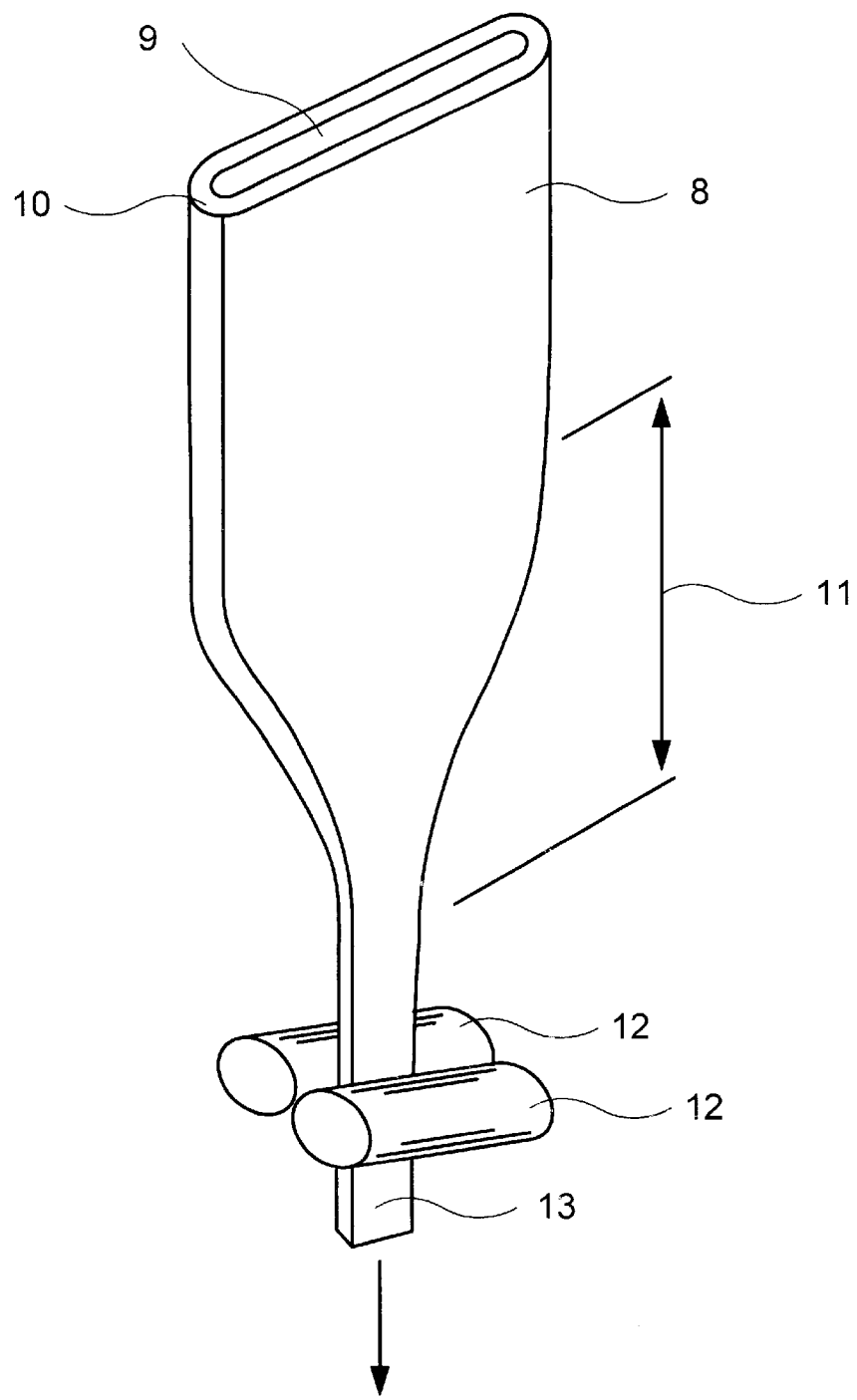
FIG. 2 represents a schematic view showing the glass stretching step of prior art.

The present invention will be described in more detail hereinafter.

The process of the present invention is intended to produce a polarizing glass article which contains shape-anisotropic metallic particles dispersed in an oriented state therein. The term "shape-anisotropy" herein means that the particles have an aspect ratio of more than 1. Relevant metals are copper, silver, gold, platinum and the like. Aspect ratio of metallic particles may suitably be selected depending on the physical properties required for a polarizing glass and may be in the range of from 2:1 to 100:1, for example. In the polarizing glass of the present invention, shape-anisotropic metallic particles are dispersed while substantially uniaxially oriented. Size and amount of metallic particles to be dispersed in the glass as well as the nature of the glass serving as matrix are not particularly limited. These may be selected as appropriate depending on the physical properties required for polarizing glass products. By way of example, particle diameter (short diameter) of metallic particles may be in the range of, e.g., 6 nm to 150 nm. Amount of the dispersed metallic particles may be in the range of $2 \times 10^{-4}$ mm to $2 \times 10^{-6}$ mm expressed as the volume ratio multiplied by the thickness of reduction layers of a polarizing glass. Examples of the glasses used as matrix include silicate glasses, borosilicate glasses, borate glasses and the like.

According to the present invention, the starting material consists of a glass which contains metallic halide particles dispersed therein. Halogens suitable for forming the metallic halides include chlorine, bromine and iodine. Metallic halides which may be mentioned are silver chloride, silver bromide, silver iodide, copper chloride, copper bromide, copper iodide, gold chloride, gold bromide, gold iodide, platinum chloride, platinum bromide, platinum iodide and the like. Glasses which contain metallic halide particles dispersed therein may be easily produced by using any of conventional processes.

The above-mentioned glass should be subjected to the drawing while maintaining at a temperature corresponding to its viscosity in the range of $2 \times 10^6$ to $7 \times 10^7$ poises. The drawing of a glass having a viscosity in the above-defined range enables the glass to be elongated while avoiding glass breakage. As is generally known, stress is required for elongating metallic halide particles. The stress to be applied to the particles under the conditions under which the glass is deformable is determined depending on the glass viscosity and the drawing speed.

A viscosity of less than $2 \times 10^6$ poises is too low to apply the stress required for the elongation of metallic halide particles. At such a low viscosity, the metallic halide particles may reach the temperature region suitable for the heat treatment to make them precipitate, which may disadvantageously cause the change in dimension (particle diameter) of the metallic halide particles during the drawing step. Thus, such lower viscosity is not preferred.

On the other hand, when the viscosity of a glass is more than $7 \times 10^7$ poises, a higher tension may be required for the drawing even when a lower drawing rate is used, which may elevate the probability of glass breaking during the drawing step. Thus, such highly viscosity is not preferred as well.

The glass subjected to drawing has preferably a viscosity of $4 \times 10^6$ to $4 \times 10^7$ poises. Since the viscosity of a glass could vary with the nature and the temperature thereof, a temperature adequate to impart the above-defined viscosity to the glass should be selected depending on the nature of a glass.

In the process of the present invention, a glass is stretched by drawing. By means of the drawing, a lengthy glass uniform in size may be obtained and a polarizing glass having higher polarizing properties can be produced.

It is known that a drawing furnace should have usually a Gaussian temperature distribution in the drawing direction. The Gaussian temperature distribution means a temperature distribution resembling to a curve traced by the formula: $T=T_0\exp(-aH^2)$, wherein To designates peak temperature, a represents a constant and H represents a distance from the origin along the drawing direction where the point of the temperature peak being elected as the origin (J. Appl. Phys., vol.49, No.8, p.4419 (1978)).

Figure 4:
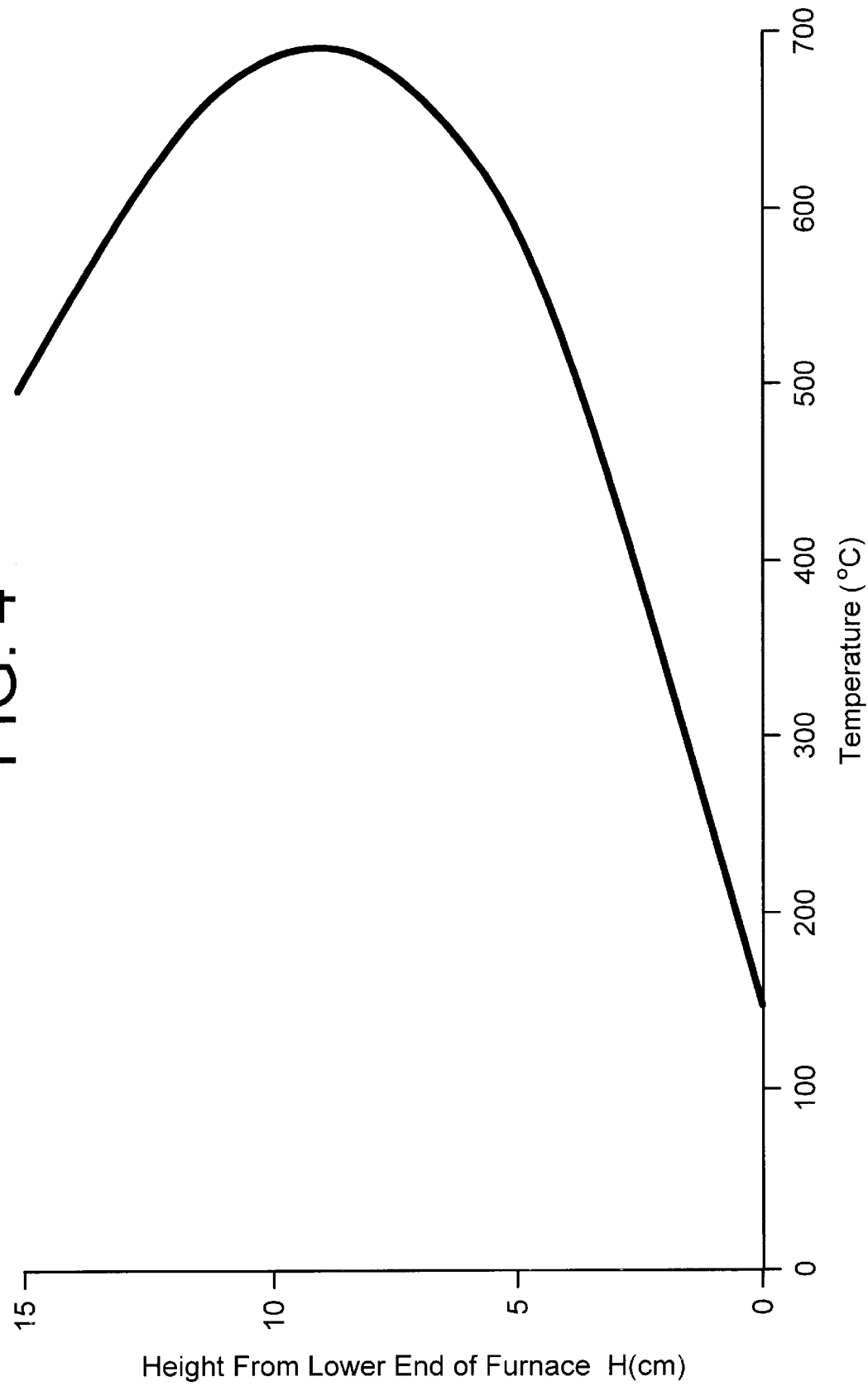
FIG. 4 is a graph representing the Gaussian temperature distribution observed in a drawing furnace.

An example of Gaussian temperature distribution concerning the internal temperature of the drawing furnace employed in experiments is shown in FIG. 4.

In the drawing furnace having the above-defined temperature distribution, a glass preform is subjected to drawing at the point where the internal temperature reaches the peak thereof, whereby the glass preform is forced to deform largely. Then, the resultant glass which had been deformed into the form of a tape is moved through the drawing furnace while decreasing in temperature as it advances along the drawing direction.

According to the drawing process, by making the resultant glass preform thinner, the temperature distribution of the glass along the drawing direction can more rapidly approximate to that observed in the furnace immediately after the drawing, which is favorable to prevent metallic halide particles from returning to a spherical shape. For avoiding such re-spheroidization (i.e. returning to a spherical shape), the thickness of the glass tape which may be obtained through the drawing is suitably 2 mm or less, preferably 1 mm or less.

Due to the thickness as low as 1 mm or less imparted to the drawn glass, the cooling thereof could be effected with an exceptionally high efficiency, thus succeeding in the avoidance of the re-spheroidization of the elongated metallic halide particles. The thickness of the drawn glass may be more preferably 0.2 mm to 0.5 mm.

To avoid the re-spheroidization of metallic halide particles, it would preferably be within 120 seconds, particularly within 60 seconds that the drawn glass preform travels from the point where the glass preform starts to be deformed to the point that is surrounded by an atmosphere of 100° C. The above-defined duration may be modified as appropriate depending on the thickness of the drawn glass preform. The thicker the glass is, preferably the faster it moves to be cooled in a shorter time.

The drawing ratio may be suitably determined depending on the desired aspect ratio of metallic halide particles. The aspect ratio of metallic halide particles, in turn, may be suitably determined by considering the desired aspect ratio of metallic particles obtained after reduction. By way of an example, metallic particles having an aspect ratio of 2:1 to 100:1 can be obtained by selecting the aspect ratio of metallic halide particles at a value of 10:1 to 500:1.

By carrying out the drawing step under the above-defined conditions, a glass which contains metallic halide particles having a desired aspect ratio and dispersed therein can be obtained. Metallic halide particles would be subsequently reduced to metallic particles, during which the volume of particles may decrease. Consequently, it may be preferred that the aspect ratio of metallic halide particles is determined by considering the aspect ratio of metallic particles to be obtained after reduction.

When the end use of the resulting polarizing glass products is an optical isolator, the above-mentioned glass preform containing metallic halide particles dispersed therein is preferably of a cross-section in the form of rectangle or rough rectangle. The term "rough rectangle" herein includes ellipse, too. The cross-sectional shape may be suitably selected depending on the shape required for the polarizing glass as final products. The term "rectangle" generally means regular square or rectangle.

The above-mentioned drawing step may be carried out preferably in such a state that a stress of 50 kg/cm² to 600 kg/cm² is applied to a glass containing metallic halide particles dispersed therein. The drawing under the stress of that range makes it possible to prevent the glass from breaking and to elongate metallic halide particles to the desired degree. With the stress of less than 50 kg/cm², metallic halide particles are unable to be elongated to reach an aspect ratio of 10:1 or more, thus is difficult to obtain a polarizing glass having its absorption peak wavelength in the infrared area. On the other hand, with the stress exceeding 600 kg/cm², even when the viscosity of the glass remains in the range of $2\times10^6$ to $7\times10^7$ poises, the glass may be applied with the stress exceeding the practical maximum breaking force, thus glass breakage is likely to occur.

In the process of the present invention, it may be preferred that the glass preform subjected to drawing has at least two optically polished faces opposite to each other, with a view to eliminate the subsequent optical polishing step. A couple of faces which should be optically polished are composed of one which behaves as light receiving face and the other which behaves as light emitting face of a polarizing glass. By optically polishing faces of a glass preform prior to drawing, a polarizing glass provided with an optical plane can be obtained without polishing subsequent to reduction. This is because an optical plane on the glass surface can be maintained during the treatment including drawing and reduction.

An additional advantage is that a polarizing glass obtained without polishing subsequent to reduction is provided with a surface suitable for use as devices and this means that it may be possible to use profitably the shape-anisotropic metallic particles present on the glass surface. If cooling is carried out at the same time as drawing, the particles present near the surface will be cooled earlier and the particles present in the inner part of the glass will be cooled later and thus they are more likely to return to a spherical shape. If the surface is polished subsequent to reduction, the particles conserving the shape-anisotropy thereof will be removed and the remaining usable particles will be only those which had returned to a spherical shape, hence it may become more difficult to obtain a polarizing glass provided with the desired properties. In contrast, the present invention can solve the problem set forth above, since a polarizing glass having a surface suitable for devices can be obtained without polishing subsequent to reduction.

The possibility of the omission of polishing subsequent to reduction can remarkably elevate the yield based on the starting material and this is also another advantage.

The process for producing a polarizing glass article of the present invention may also be applicable to the production process of a composite polarizing glass which is composed of a glass layer containing shape-anisotropic metallic particles and a base glass substrate containing neither metallic particles nor metallic halide particles and showing substantially no light scattering.

An example of the drawing apparatus adapted for use in the present invention is shown in FIG. 1.

In FIG. 1, reference numeral 1 designates a preform, and preform 1 is held under feeding device 2 by means of a wire in a manner downwardly displaceable. Preform 1 is softened around the tip thereof in heating furnace 3 and is drawn downwardly from its bottom end by means of pulling device 4. As the result of that drawing, the glass preform is converted into tape-shaped glass 5 in which elongated metallic halide particles are dispersed. Tape-shaped glass 5 continues to proceed to be discharged out of heating furnace 3 and then quickly quenched with external air.

On cylindrical hood 6 situated above heating furnace 3 is attached upper lid 7 which is provided with an opening for the passage of the wire which connects feeding device 2 with preform 1. Hood 6 and lid 7 are effective to prevent the glass from breaking due to a sudden increase of temperature and to avoid the heat dispersion out of heating furnace 3. The internal temperature of heating furnace 3 is controlled by means of a temperature control unit not shown so that the viscosity of preform 1 placed in heating furnace 3 may be suitably controlled.

By controlling the feeding speed of feeding device 2 as well as the pulling rate and the tensile force applied by pulling device 4, from preform 1, tape-shaped glass 5 could be obtained in which metallic halide particles having the desired aspect ratio are dispersed.

The resulting tape-shaped drawn glass is then subjected to reduction treatment, during which a part or all of the metallic halide particles contained in the glass are converted to metallic particles. This reduction treatment may be carried out, e.g., by thermally treating the tape-shaped glass in a reducing gas atmosphere. Suitable reducing gases which may be mentioned are gaseous hydrogen, $CO—CO_2$ gas and the like. Reduction conditions may be modified depending on the nature of metallic halide to be reduced. The temperature for reduction should be selected considering that at an excessively high temperature the resulting metallic particles are likely to return to a spherical shape. By way of an example, copper halide may suitably be reduced at a temperature of about 350° to 550° C. The duration of reduction could be properly decided while taking together the temperature for reduction and the desired degree of reduction into consideration and is generally selected in the range of 30 minutes to 10 hours.

EXAMPLES

The present invention will further be described by referring to the following examples.

Example 1

(1) Preparation of preform

A glass having a composition consisting of 59.9% of $SiO_2$, 2% of $AlF_3$, 6.8% of $Al_2O_3$, 20% of $B_2O_3$, 9.7% of $Na_2O$, 1% of NaCl, 0.8% of CuCl and 0.1% of SnO was heated at 1410° C. in a 5-liter platinum crucible into a molten state, which was then cast into a mold and gradually cooled at 470° C. to form a glass block. A specimen of a desired size was cut out from the resulting glass block, then thermally treated at 765° C. for 90 minutes to obtain a glass containing copper chloride particles having an average particle diameter of about 150 nm. The resulting glass was further processed into a glass preform in the form of a plate (20 mm×2 mm×200 mm) having two optically polished faces measuring 20 mm×200 mm.

(2) Drawing

The preform obtained as above was subjected to drawing in the drawing apparatus shown in FIG. 1.

Preform 1 was attached to feeding device 2 (the upper end of preform 1 was suspended from the lower end of feeding device 2 by means of a wire). Preform 1 was positioned so that the lower end thereof may reach near the center of heating furnace 3 (about 50 mm above the bottom end of the furnace). The internal temperature of heating furnace 3 was elevated to 710° C. by means of a temperature controlling unit not shown. (Here, the term "internal temperature" means the peak of temperature and the peak is situated near the midpoint along the height of the furnace. The term "internal temperature" hereinafter means the peak of temperature.) A wire was wound around the lower end of preform 1 and, after the internal temperature of furnace 3 had reached the plateau, the glass started to be elongated by putting the wire under load.

The drawn tape-shaped glass was held between the drive rollers acting as pulling device 4 and the internal temperature of heating furnace 3 was reset at 690° C. (viscosity of the glass: $v=2\times10^7$ poises; the viscosity was calculated by using viscosity curve). After the temperature had reached the plateau, the tape-shaped glass was continuously pulled by applying tensile force to the lower end of the glass by means of the rollers. The feeding speed of feeding device 2 was 6 mm/minute, the pulling rate of pulling device 4 was 60 cm/minute and the moving period (time required for the preform to move from the point where the internal temperature of furnace 3 reached the peak in other words, the point where the preform started to be deformed to the point that was surrounded by an atmosphere of 100° C. ) was 11 seconds.

The tensile load was 400 g, the cross section of the drawn glass was measured 2 mm×0.2 mm and the stress calculated as the quotient of the load 400 g divided by the cross section was 100 kg/cm$^2$.

The term "drawing speed" herein means the distance per minute traveled by the portion having a cross section of 2 mm×0.2 mm.

The average aspect ratio of the copper chloride particles contained in the glass was about 35:1 as observed on a transmission electron microscope.

(3) Reduction

The resulting tape-shaped glass was thermally treated at 425° C. for 4 hours in a gaseous hydrogen atmosphere to obtain a polarizing glass (average aspect ratio of copper particles was 5:1). This polarizing glass had an extinction ratio of 50 dB (at wavelength of 1.55 μm).

Examples 2 to 6

In a manner similar to that of Example 1, five kinds of glass preforms were prepared. Each preform contained copper chloride particles having an average particle diameter of 150 nm and had a thickness of 2.0, 5.0, 8.0, 12.0 and 20.0 mm, respectively.

While viscosity of the glass was made $2\times10^7$ poises (viscosity of the glass at the point where the internal temperature of the furnace reached the peak), each of these preforms was drawn under the same conditions of the feeding speed, the pulling rate and the stress as those used in Example 1. Then the obtained glasses were subjected to reduction with hydrogen (at 425° C. for 4 hours) to produce polarizing glasses each different in thickness.

The results are shown in Table 1. Table 1 shows extinction ratios (at the wavelength of 1.55 μm) and the thicknesses of the polarizing glasses.

TABLE 1

|  | Example | | | | |
| --- | --- | --- | --- | --- | --- |
|  | 2 | 3 | 4 | 5 | 6 |
| Thickness of polarizing glass | 0.2 | 0.5 | 0.8 | 1.2 | 2.0 |
| Extinction ratio (dB) | 55 | 53 | 50 | 48 | 41 |

Figure 3:
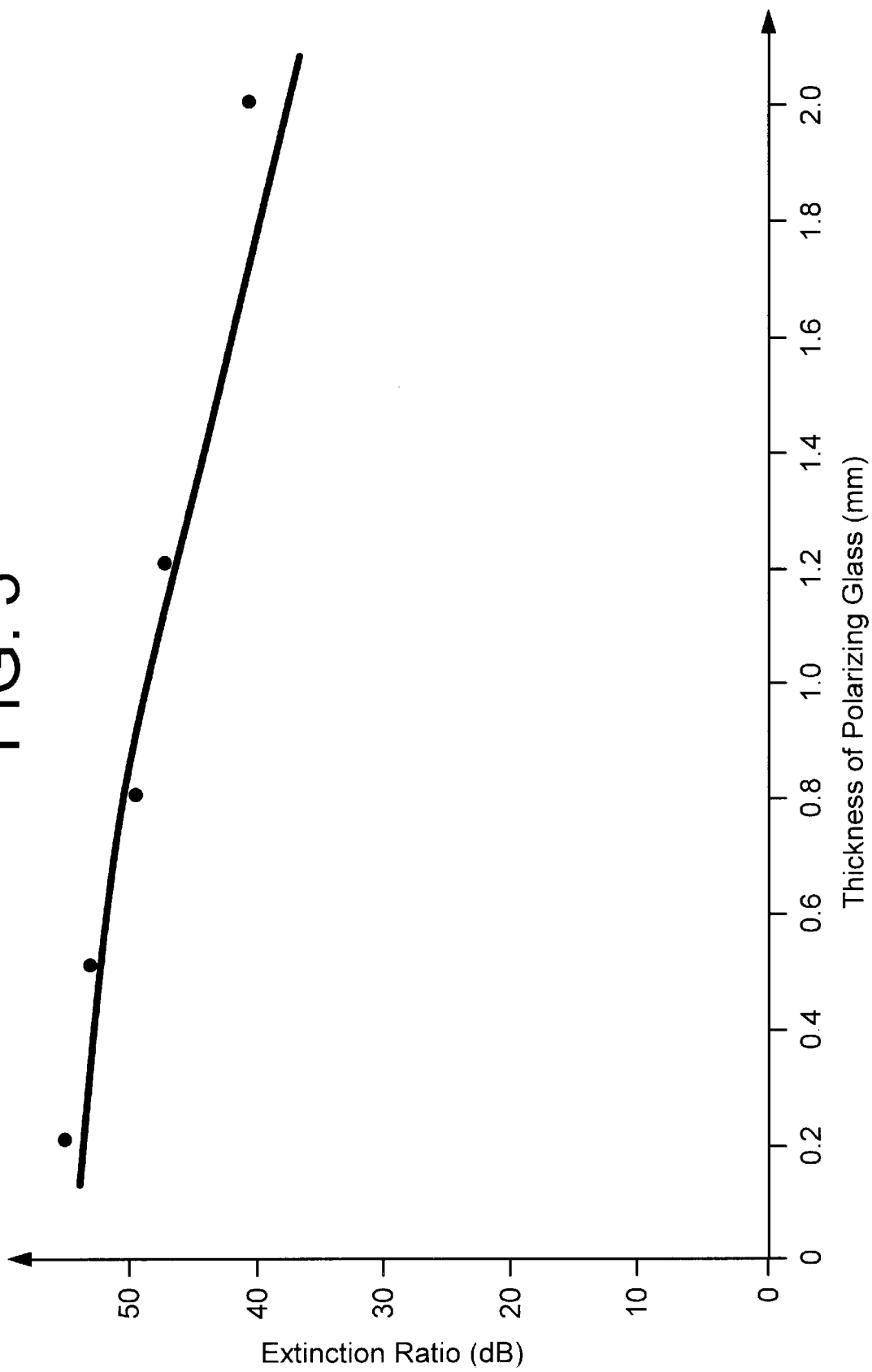
FIG. 3 is a graph representing relationship of the thickness versus extinction ratio of polarizing glass.

The results shown in the Table 1 are further represented in FIG. 3.

It should be understood that, by making the drawn glass thinner, the cooling effect could be improved and the respheroidization could be prevented more effectively and thus a polarizing glass having a higher extinction ratio could be obtained.

In the field of optical communication, a polarizer to be incorporated into an isolator should be made from a polarizing glass having a specified extinction ratio of at least 40 dB. It will be appreciated that a suitable polarizing glass having an extinction ratio of 40 dB or more could be obtained by giving the drawn glass a thickness of 2 mm or less, preferably 1.0 mm or less.

Comparative Example 1

A polarizing glass was prepared in a manner similar to Example 1 except that the internal temperature of the heating furnace was set at 760° C. (which imparted to the glass a viscosity of $1.3 \times 10^6$ poises). The obtained polarizing glass had an extinction ratio of 3 dB (at wavelength of 1.31 μm).

This was due to the fact that the glass had a low viscosity and hence sufficiently high tensile force could not be applied upon drawing. The stress at the drawing was 40 kg/cm$^2$.

Another polarizing glass was tried to be produced in a manner similar to Example 1 except that the internal temperature of the heating furnace was set at 660° C. (at which the glass exhibited a viscosity of $8.3 \times 10^7$ poises). In this experiment, however, the stress became excessive at the drawing so that the glass was broken.

Reference Example

A glass preform was prepared by holding a glass plate (20 mm×6 mm×220 mm, without copper chloride particles) not subjected to the heat precipitation treatment between a couple of glass plates (20 mm×1 mm×220 mm) containing copper chloride particles having an average particle diameter of 130 nm.

The prepared preform was subjected to drawing in the apparatus shown in FIG. 1, while the temperature of the preform being kept at 690° C. (at which the glass exhibited a viscosity of $2 \times 10^7$ poises, the viscosity of the glass at the point where the internal temperature of the furnace reached the peak). The feeding speed of feeding device 2 was 6 mm/min., the pulling rate of pulling device 4 was 60 cm/minute, the tensile load was 1,600 g and the moving period (time required for the preform to move from the point where the internal temperature of furnace 3 reached the peak in other words, the point where the preform started to be deformed to the point that is surrounded by an atmosphere of 100° C. ) was 11 seconds.

A fused composite glass which had been heat molten at the same time as drawn was obtained. The average aspect ratio of the copper chloride particles contained in the surface layer of the composite was about 30:1. The resulting glass composite was subjected to reduction with hydrogen (at 425° C. for 4 hours) to obtain a polarizing glass.

This polarizing glass had an extinction ratio of 48 dB (at wavelength of 1.31 g m) and an insertion loss of 0.10 dB. This was because the polarizing glass contained no copper chloride particles in the central layer (substrate) thereof and thus prevented light from scattering.

According to the production process of the present invention, a polarizing glass can be prepared with a high yield from a starting material of a glass containing metallic halide particles, while avoiding glass breakage or fracture during elongation as well as preventing the elongated metallic halide particles from returning to a spherical shape.

Additionally, according to the process of the present invention, a polarizing glass can be obtained from the glass preform which contains metallic particles without relying on a coating surface glass and therefore the time required for the reduction can be substantially shortened. Further, according to the production process of the present invention, by making the drawn glass thinner, the cooling effect can be improved so that metallic particles can solidify while kept in the elongated state. Consequently, the metallic particles are permanently prevented from returning to a spherical shape and thus a polarizing glass excellent in polarization properties can be produced with a high efficiency.

What is claimed is:

1. A process for producing a polarizing glass article containing shape-anisotropic metallic particles dispersed in an oriented state therein, which comprises:

drawing a glass preform containing metallic halide particles dispersed therein to elongate said metallic halide particles while viscosity of the glass is held above $2 \times 10^6$, but below $7 \times 10^7$ poises, to obtain a glass having a thickness of 2 mm or less;

cooling the drawn glass under conditions which avoid re-spheroidization of the elongated metallic halide particles and breakage of the drawn glass; and subjecting the drawn glass to reducing treatment so that a part or all of the metallic halide particles are reduced to metallic particles.

2. The process of claim 1 wherein said drawing is carried out to obtain a glass having a thickness of 1 mm or less.

3. The process of claim 1 wherein said drawing is carried out to obtain a glass having a thickness of from 0.2 to 0.5 mm.

4. The process of claim 1 wherein said drawn glass preform travels within 120 seconds from the point where said glass preform starts to be deformed during said drawing to the point that is surrounded by an atmosphere of 100° C.

5. The process of claim 1 wherein said drawing of said glass preform is effected under a stress of 50 kg/cm$^2$ to 600 kg/cm$^2$ inclusive.

6. The process of claim 1 wherein said drawing is effected on the glass preform having at least two polished faces opposite to each other.

7. The process of claim 1 wherein said drawing of said glass preform is effected while its viscosity is held from $4 \times 10^6$ to $4 \times 10^7$ poises.

8. The process of claim 1 wherein said metallic halide particles are selected from the group consisting of halide particles of copper, silver, gold and platinum.

9. The process of claim 1 wherein said drawn glass preforms is cooled at a rate $\Delta T$ until the temperature of the drawn glass passes an annealing point, wherein $\Delta T \geq (T1-T2)/120$ sec, wherein T1 is a temperature at which the glass preform starts to be deformed during the drawing, and T2 is a temperature of 100° C. of atmosphere surrounding the drawn glass.

* * * * *